United States Patent
Seytter et al.

(10) Patent No.: US 6,314,541 B1
(45) Date of Patent: Nov. 6, 2001

(54) METHOD FOR COMPUTER-AIDED SIGNALING IN AN AUTOMATIC REPEAT REQUEST PROCEDURE

(75) Inventors: Fritz Seytter; Bernhard Wimmer, both of München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/194,470
(22) PCT Filed: May 7, 1997
(86) PCT No.: PCT/DE97/00924
§ 371 Date: Nov. 30, 1998
§ 102(e) Date: Nov. 30, 1998
(87) PCT Pub. No.: WO97/47104
PCT Pub. Date: Dec. 11, 1997

(30) Foreign Application Priority Data

May 31, 1996 (DE) .............................................. 196 21 995

(51) Int. Cl.[7] ...................................................... H04L 1/16
(52) U.S. Cl. ............................................ 714/748; 714/751
(58) Field of Search ...................................... 714/751, 748

(56) References Cited

PUBLICATIONS

An Intelligent Hybrid Type II ARQ/FEC Logical Link Control Protocol for GSM Mobile Communication System, Gagnaire et al., pp. 277–281.

Hybrid ARQ System for HF Channels Based on Codeword Partitioning, Fernandez, pp. 73–77.

Rate Compatible Punctured Convolutional Codes (RCPC Codes) and Their Applications, Hagenauer, pp. 389–400.

Kallel et al., "Design Framework for a Mobile Data Link Protocol", ICWC '92, pp. 44–47, Dec. 1992.*

* cited by examiner

*Primary Examiner*—Stephen M. Baker
(74) *Attorney, Agent, or Firm*—Bell, Boyd & Lloyd LLC

(57) ABSTRACT

In an automatic repeat request procedure (ARQ), a first message is transmitted from a first computer unit to a second computer unit. Upon detection of a transmission error in the first message, a back-signalling message is coded in the second computer unit and transmitted to the first computer unit. The back-signalling message has at least one request field having the length of exactly one bit. A second message is requested by means of the request field. The second message contains additional information required for the error correction of the first message, or is the repetition of a message already transmitted or lost. The second message is transmitted to the second computer unit and decoded in the second computer unit together with the first message.

4 Claims, 2 Drawing Sheets

METHOD FOR COMPUTER-AIDED SIGNALING IN AN AUTOMATIC REPEAT REQUEST PROCEDURE

BACKGROUND OF THE INVENTION

1. Field of the Invention

The present invention relates to a method for computer-aided back signaling in an automatic repeat request procedure wherein a requested further message which contains redundancy information for the purpose of error correction of the first message is identified uniquely from the back-signaling message.

2. Description of the Prior Art

In a so-called type II automatic repeat request procedure (ARQ-II procedure), messages are exchanged between two computer units. In this case, an information word to be transmitted is coded by using a perforation code. An information word is understood in this context as a bit sequence of arbitrary length which contains the actual information to be transmitted.

Different variants of perforation codes are known, for example there is the so-called perforation convolutional code, which is described in document [1]. Also described in document [1] is the automatic Type II repeat request procedure.

Further codes suitable for ARQ-II are known, for example, from document [2]. The Type II automatic repeat request procedure also can be used for this type of perforation code.

During coding, messages are formed which, on the one hand, contain the information of the information word and, on the other hand, have redundancy information for error correction, independent of the specific perforation code employed, such messages are formed for the information word in a way which is characteristic of the respective perforation code.

In the ARQ procedure, the messages are transmitted in such a way that, at the start, a first message is transmitted from a first computer unit to a second computer unit. The first message contains at least the information of the information word and information for the purpose of error detection. If, during decoding of the first message, an error is detected in the second computer unit, a second message is requested from the first computer unit by means of a back-signalling message which contains redundancy information for the purpose of error correction of the first message. The second message is also coded during formation of the messages. The second message is transmitted to the second computer unit. The second message is decoded in the second computer unit together with the first message. For this purpose, the first message must be buffered in the second computer unit in coded form. If the first message and the second message are decoded together, it is then possible to correct errors with an increased probability by means of the redundancy information contained in the second message relating to the first message. If decoding without errors still remains impossible, further redundancy in the form of further messages from the first computer unit is requested. After the transmission of a third message, which has further redundancy information relating to the first message, to the second computer unit, the third message is decoded in the third computer unit together with the first message and the second message. This principle can be continued with further messages which contain further redundancy information relating to the first message until decoding without error is possible in the second computer unit. This mode of procedure is described in document [1].

In the back-signalling message, by means of which a further message and, thus, further redundancy information is requested, it is necessary to specify which further message is, requested, that is to it must be clear from the back-signalling message for the first computer unit whether the second message, the third message, etc. is to be transmitted. Furthermore, the information on identifying the further message is of great importance, since in order to correctly decode the composed message, which is produced, for example, from the first message and the second message, it is necessary to know which messages are being combined. This purpose is fulfilled by the identification bit in the back-signalling message, whose function also can be understood as a counter.

The problem to which the present invention is directed is to specify an ARQ procedure in which a requested further message which contains redundancy information for the purpose of error correction of the first message is identified uniquely from the back-signalling message.

SUMMARY OF THE INVENTION

Accordingly, pursuant to a method of the present invention, the ARQ procedure is carried out by means of a back-signalling message which contains exactly one bit for the purpose of identifying the requested further message by this means, the redundancy information relating to the first message is transmitted to the second computer unit in order to render error correction possible; that is, decoding without errors of the first message together with the further transmitted message.

Specifying the requested message in exactly one bit creates a very simple possibility of identifying the requested message in the first computer unit. Furthermore, the use of only one bit for the purpose of identifying the requested message minimizes the transmission rate, which is required for transmitting the back-signalling message, with respect to the request for a further message.

The evaluation of the back-signalling message in the first computer unit is also performed very simply, since only one bit needs to be evaluated in order to obtain the information as to which message is to be transmitted to the second computer unit. As a result, the arithmetic capability required by a computer for evaluation purposes is kept very low, since there is no need to carry out any complicated evaluation procedures.

Additional features and advantages of the present invention are described in, and will be apparent from, the Detailed Description of the Preferred Embodiments and the Drawings.

DESCRIPTION OF THE DRAWINGS

FIGS. 3a to 3d show message flowcharts in which different instances of error in the ARQ procedure are described.

DETAILED DESCRIPTION OF THE PREFERRED EMBODIMENTS

Figure 1:
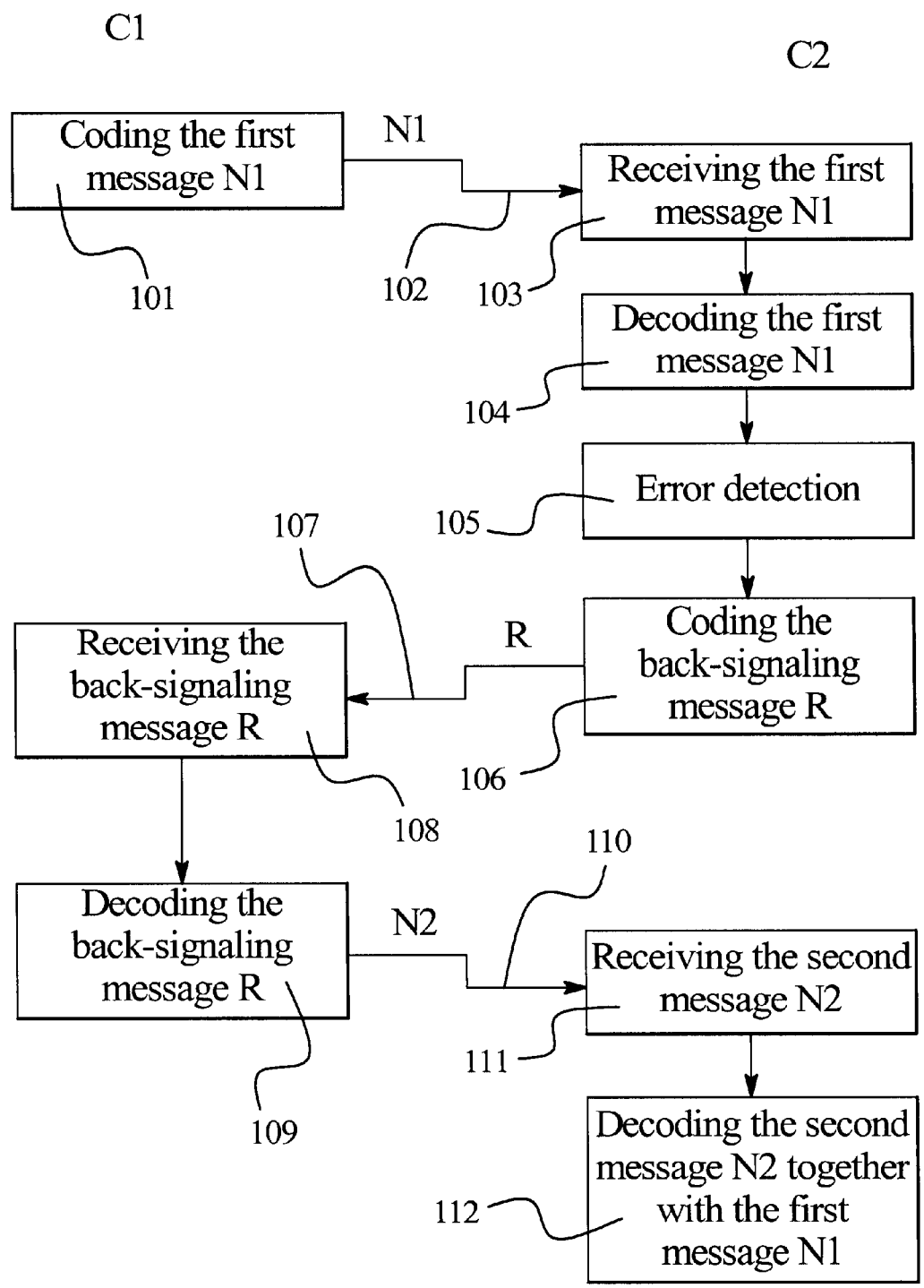
FIG. 1 shows a flowchart in which the course of a typical automatic repeat request procedure is represented in the form of a message flowchart.

FIG. 1 represents, in the form of a message flowchart, the automatic repeat request procedure (Type II, ARQ-II Automatic Repeat Request Procedure) of so-called Type II which is described, for example, in document [1].

Messages are exchanged between two computer units in the ARQ-II procedure. In this case, an information word I to be transmitted is coded 101 in a first computer unit C1 by using a perforation code. Furthermore, in addition to the information word I, a bit sequence CRC is provided for the purpose of error detection, for example by means of a CRC procedure (Cyclic Redundancy Check) and/or with a prescribed number of tailbits T, the number of which corresponds to the degree of a feedback shift register used for coding. The tailbits serve in their true function to bring the feedback shift register into a defined final state; for example, into a state in which all registers of the feedback shift register have the value 0.

The information word I is coded 101; for example, using a perforation convolutional code or a code which is described in Document [2]. This leads to an intermediate word ZW which is "perforated" in a further step. Under a perforation is a selection, dependent on a perforation code employed and prescribed by the perforation code, of bits of the intermediate word ZW, and the partitioning of the intermediate word ZW into messages to be transmitted. In this case, a first message N1 is formed which contains at least the information word I and information which is used to detect transmission errors in the decoding of the first message N1 in a second computer unit C2. In addition, further messages Ni are formed from the intermediate word ZW and stored in the first computer unit C1. The index i is a unique indication of the respective further message Ni. and i is an arbitrary natural number. For example, the index i is used with the value 2 to denote a second message N2 and is used with the value 3 to denote a third message N3. The further messages Ni respectively contain redundancy information relating to the first message N1 or to further messages Ni, which is used together with the previously transmitted messages N1 to Ni-1 in the second computer unit C2 for the purpose of decoding the information word I with correction of errors. Decoding with correction of errors is understood in this context as the following mode of procedure after the transmission of the further messages Ni to the second computer unit C2. Usually, in each case a further message Ni is transmitted to the second computer unit C2, wherein the further message Ni is decoded together with non-decoded, previously received messages buffered in the second computer unit C2.

After transmission of the first message N1 from the first computer unit C1 to the second computer unit C2 102, the first message N1 is received 103 in the second computer unit C2 and decoded 104 also an error detection procedure is applied 105 to the decoded first message N1; for example, with the aid of the additional bit sequence CRC and/or with the aid of the tailbits T. If the first message N1 was transmitted without errors, the information word I obtained by decoding can be processed in the second computer unit.

If, however, an error is detected, for example a transmission error which cannot be remedied with the aid of an error correction procedure provided optionally in addition thereto, an item of redundancy information relating to the first message N1 is required in the perforation code. The required redundancy information is contained in the further message Ni. In order to obtain this redundancy information, a back-signalling message R is coded 106 in the second computer unit C2 and transmitted 107 to the first computer unit C1. A further message Ni is requested by means of the back-signalling message R. The back-signalling message R is received 108, decoded 109 and evaluated by the first computer unit C1.

Figure 2:
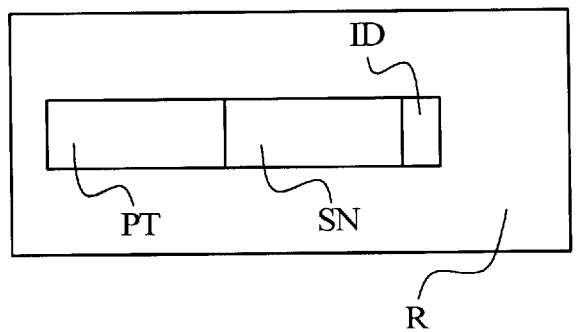
FIG. 2 shows a flowchart in which a possible structure of the back-signalling message is represented.

A possible structure of the back-signalling message R is represented in FIG. 2. The back-signalling message R has at least the following information:

- a backward information field PT in which it is specified whether additional information was at all requested by means of the backward-signalling message R; the backward information field PT can, for example, be realized by one bit indicated by means of a first bit value that a further message Ni is being requested;
- a sequential number field SN which contains a counter, for example of width 5 bits, in order to cover a number range of 0 to 31; the sequential number field SN uniquely characterizes the membership of the back-signalling message R to a specific information word I;
- a request field ID with a specification of the requested further message; according to the present invention, this field of the back-signalling message R has a length of exactly one bit.

Additional information fields can, of course, be present in the back-signalling message R in a way specified by protocol. Again, it is provided in one variant that the back-signalling message R has no backward information field PT.

If, on account of an error occurring in the transmission of the first message N1, the second message is requested by means of the back-signalling message R, the field of the specification of the requested further message ID has a first value. If a back-signalling message R is received by the second computer unit C2 after the transmission of the first message N1 from the first computer unit C1, and if the request field ID has the first value, the first computer unit C1 can detect that the second message N2 is being requested.

On the basis of the back-signalling message R with the request field with the first value, the second message N2 with additional redundancy information relative to the first message N1 is transmitted 110 from the first computer unit C1 to the second computer unit C2. The second message N2 is received 111 and stored in the second computer unit C2. The coded first message N1, which was stored in coded form in the second computer unit C2, is decoded 112 together with the second message N2. An error detection procedure is applied, in turn, to the decoded message thereby formed.

If, in turn, an error is detected, a further back-signalling message R is coded and transmitted to the first computer unit C1. The third message N3 is requested in this back-signalling message R, and this is specified by a second value of the request field ID. The back-signalling message R is received in the first computer unit C1, and the request field ID is evaluated. It is detected in the first computer unit C1 by means of the second value in the request field ID that the third message N3 is being requested. The third message N3 is transmitted to the second computer unit C2 on the basis of this value in the request field ID.

After the reception of the third message N3 in the second computer unit C2, the coded first message N1, the coded second message N2 and the third message N3 are decoded together. An error detection procedure is applied, in turn, to the decoded message formed therefrom.

If an error is detected, a further back-signalling message R is coded and transmitted to the first computer unit C1. A fourth message N4 is requested in this back-signalling message R and is specified by the first value of the request field ID.

This mode of procedure can be repeated iteratively until it is possible to decode the received messages in the second computer unit C2 without errors. In each iteration step, a further message Ni is respectively requested, which is characterized by a request field ID which changes the value in each case with each iteration step.

If the decoding of the combined messages can be realized without errors, something for which the probability increases with a larger amount of additional redundancy information, that is to say with a larger number of further messages Ni, the message decoded without errors contains the information word I, which is then processed.

Figure 3A:
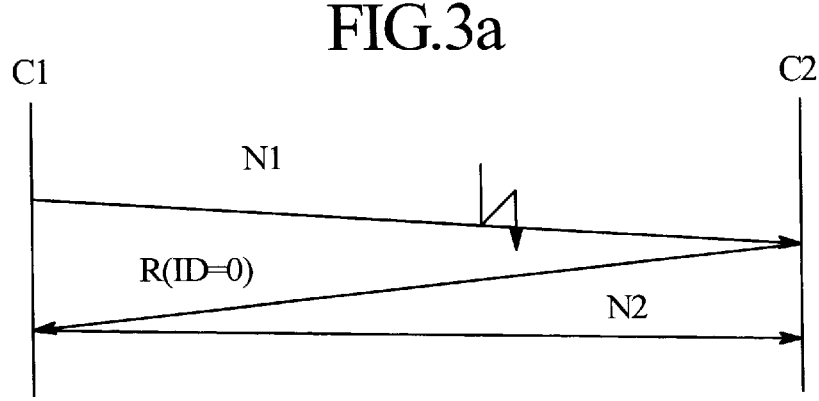
Figure 3B:
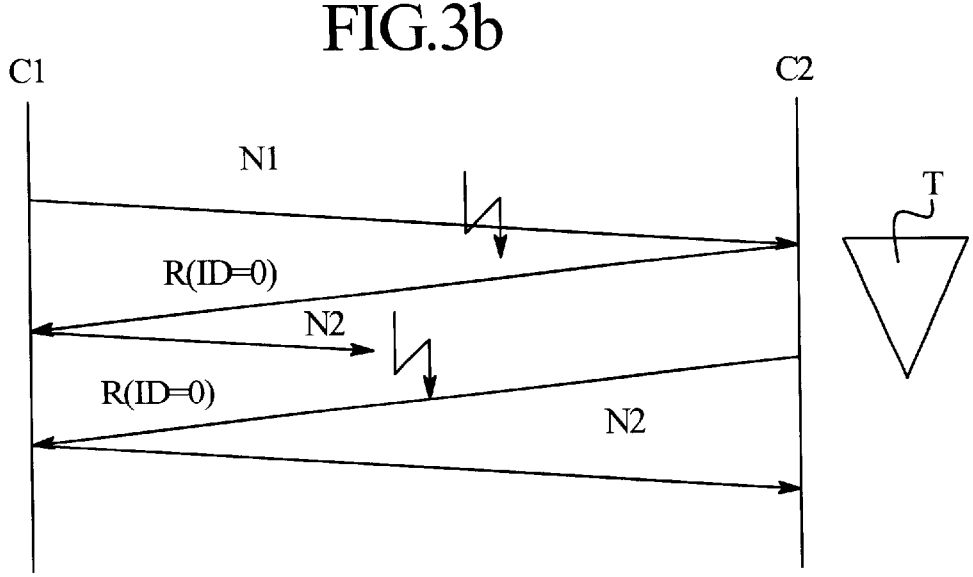

Two possible embodiments of the method of the present invention are sketched in FIGS. 3a and 3b. The lightning symbol ⚡ in the respective transmission arrows of the individual messages symbolizes the occurrence of an error in the transmission of the corresponding message.

In FIG. 3a, an error occurs in the transmission of the first message N1. This fact is detected in the second computer unit C2, and the back-signalling message R is transmitted to the first computer unit C1. The request field ID of the back-signalling message R has the first value, for example the value 0. Thereupon, the second message N2 is transmitted to the second computer unit C2.

In FIG. 3b, transmission errors occur both in the first message N1 and in the transmission of the second message N2. In this case, the second message N2 is requested by means of a back-signalling message R with the first value in the request field ID. The transmission of the second message N2 is so strongly disturbed in this case, which is represented in FIG. 3b, that the second message N2 does not arrive at the second computer unit C2.

In accordance with a time counter T, it is decided in the second computer unit C2 to request once again the requested, but not received a message N2. For this purpose it transmits a further back-signalling message R, once again with the first value in the request field ID. The first computer unit C1 will transmit the message N2 again after receiving this message.

This example illustrates the necessity of the counter in the request field ID. Specifically, if the third message N3 were transmitted anyway from the first computer unit C1 upon request, the third message N3 could not be correctly assigned in the second computer unit C2 and decoding would be impossible.

However, exactly one bit in the request field ID suffices to identify uniquely the respectively requested message, since it only needs to be made known in the first computer unit C1 whether the message respectively already transmitted has to be repeated or whether the next message present is to be sent.

Although the present invention has been described with reference to specific embodiments, those of skill in the art will recognize that changes may be made thereto without departing from the spirit and scope of the invention as set forth in the hereafter appended claims.

The following publications have been quoted in this document:

[1] J. Hagenauer, IEEE Transactions on Communications, Vol. 36, No. 4, Rate-Compatible Punctured Convolutional Codes (RCPC-Codes) and their Applications, S. 389 to 400, April 1988

[2] J. Serrat-Fernández and J. Dalmau-Royo, Hybrid-ARQ System for HF-Channels Based on Codeword Partitioning, IEE Proc. Commun., Vol. 143, No. 2, S. 73–77, April 1996

What is claimed is:

1. A method for computer-aided back signaling in an automatic repeat request procedure, comprising the steps of:

coding an information word, which has an arbitrary number of bits, in a first computer unit into at least a first message and further messages by using a perforation code;

transmitting the first message in the first computer unit to a second computer unit;

receiving the first message in the second computer unit;

decoding the first message in the second computer unit;

checking in the second computer unit whether the first message was transmitted without errors;

coding and transmitting at least one back-signaling message to the first computer unit for the case in which the first message was not transmitted without errors, wherein the back-signaling message has at least one request field with a length of exactly one bit by means of which a second message is identified;

receiving and decoding the back-signaling message in the first computer unit;

transmitting the requested second message to the second computer unit, wherein the requested second message contains an additional item of information relating to the first message for the purpose of error correction together with the first message in the second computer unit; and receiving and decoding the second message in the second computer unit together with the first message;

wherein a value of the at least one request field does not change upon further iterative transmissions of further back-signaling messages upon further messages being received in the second computer unit with errors.

2. A method as claimed in claim 1, wherein the perforation code is a perforation convolutional code.

3. A method as claimed in claim 1, further comprising the steps of:

requesting further messages by means of further back-signaling messages;

transmitting the further messages from the first computer unit to the second computer unit; and decoding the further messages in the second computer unit together with the previously received, coded messages.

4. A method as claimed in claim 2, further comprising the steps of:

requesting further messages by means of further back-signaling messages;

transmitting the further messages from the first computer unit to the second computer unit; and decoding the further messages in the second computer unit together with the previously received, coded messages.

* * * * *